United States Patent [19]

Ohsako et al.

[11] 4,092,533
[45] May 30, 1978

[54] TIMING SIGNAL GENERATING DEVICE

[75] Inventors: Kyoichi Ohsako, Tokyo; Katsuyoshi Oyama, Ohi, both of Japan

[73] Assignee: Laurel Bank Machine Co., Ltd., Tokyo, Japan

[21] Appl. No.: 687,222

[22] Filed: May 17, 1976

[51] Int. Cl.² ............................................. G01D 5/34
[52] U.S. Cl. ................................. 250/231 SE; 250/229
[58] Field of Search .................... 324/175; 250/231 R, 250/231 SE, 237 G, 229; 356/169

[56] References Cited

U.S. PATENT DOCUMENTS

| | | | |
|---|---|---|---|
| 3,345,812 | 10/1967 | Pickering | 324/175 |
| 3,546,470 | 12/1970 | Junkert et al. | 250/231 SE |
| 3,562,741 | 2/1971 | McEnvoy et al. | 324/175 |
| 3,707,678 | 12/1972 | Champagnon | 324/175 |

Primary Examiner—David C. Nelms
Attorney, Agent, or Firm—Cameron, Kerkam, Sutton, Stowell & Stowell

[57] ABSTRACT

A timing signal generating device operates in response to angular displacement of a rotating shaft. The shaft has a disc provided with a reference mark and a plurality of timing marks apart from one another in a circumferential direction. A first detector is located adjacent to the disc to detect the reference mark and to reset a shift register. A second detector is also located adjacent to the disc to generate timing pulses in response to the timing marks and supply the pulses to the shift register. Each of plural logic gates has two input terminals each of which is connected to an output of a predetermined step of the shift register, so that an output signal outputted from each logic gate to the corresponding driving circuit for an operating device constitutes a timing signal carrying information including starting and terminating times of operation.

8 Claims, 5 Drawing Figures

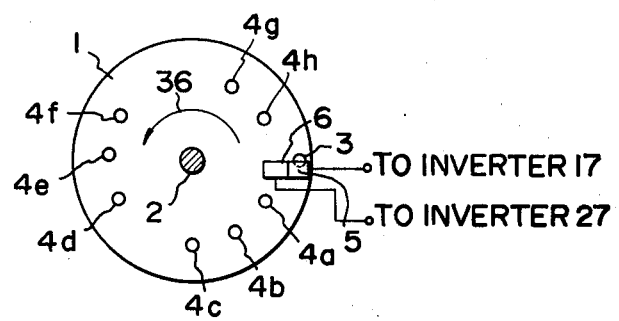
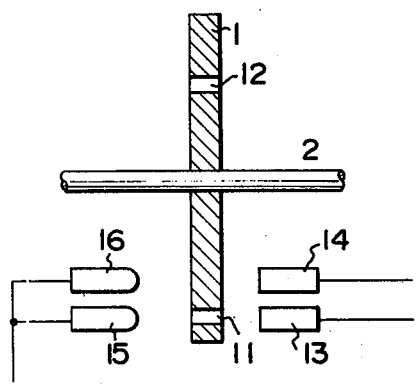
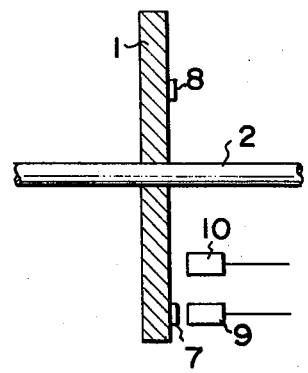

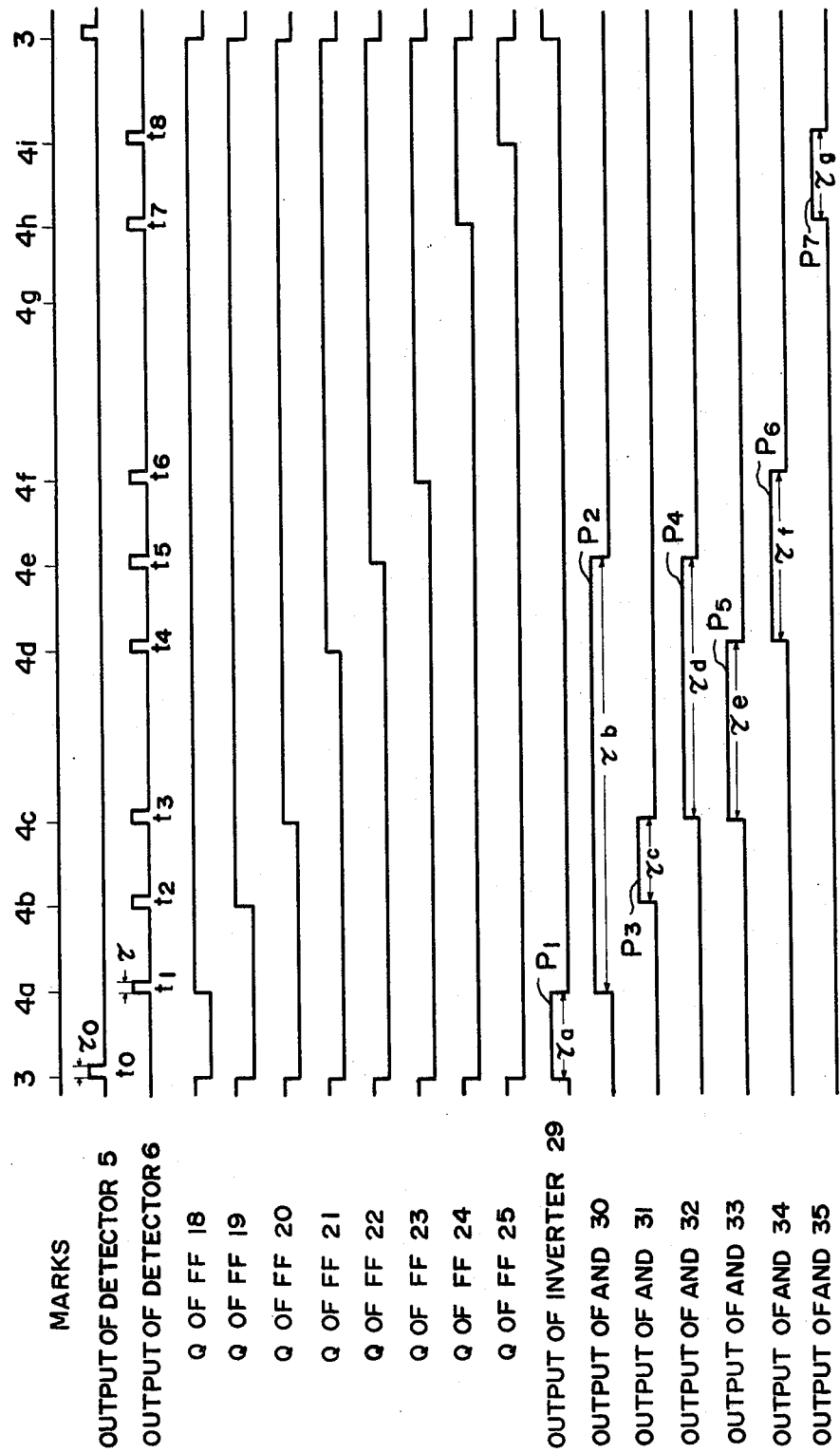

TIMING SIGNAL GENERATING DEVICE

BACKGROUND OF THE INVENION

1. Field of the Invention

The present invention relates to a timing signal generating device, and particularly to a timing signal generating device adapted to generate timing signals for operating each of plural operating devices for a predetermined time period during every rotation of a rotation member.

2. Description of the Prior Art

Heretofore, there have been known coin treating machines such as coin counting and wrapping machines as shown in U.S. Pat. Nos. 3,416,291 and 3,469,365. In such machines, many operations such as the operations of stacking a predetermined number of coins in a stacking cylinder assembly, gripping the stacked coins and removing the same from the stacking cylinder assembly by opening the assembly, carrying the coin stack to the wrapping rollers while gripping the coin stack, holding the coin stack by means of the wrapping rollers, and supplying a wrapping web to the wrapping rollers so as to cause the coin stack to be tightly wound by the wrapping web, are sequentially performed with predetermined timing. Timing and sequence information for these operations are given from plural microswitches pushed by the associated cams which are mounted on a rotating cam shaft adapted to cause each operating section in the wrapping machine to complete its one cycle of operation during every rotation of the shaft.

In such a machine, however, it has been difficult to make the timing of the ON and OFF of each microswitch consistent with the desired timing. Particularly, it was very difficult to make the timing of the ON of one microswitch consistent with that of the OFF of another microswitch. Namely, accurate timing information could not be obtained. This is because of the difficulty in accurately working the cam surface of each cam and inaccuracy in mechanical operation of the microswitch per se. Further, in the case that many operational sections are sequentially operated, there are required microswitches in a number equal to that of the timing information required and a corresponding number of cams each having a configuration shaped to give the required timing information. In this case, it was very difficult to accurately mount the cams on the cam shaft and locate the microswitches in accurate position thereto.

Furthermore, if the rotation speed of the cam shaft is increased for the purpose of elevating the rate of operation, error in timing information will become a large problem, and consequently it has been impossible to elevate the speed of operation.

It is, therefore, one object of the present invention to provide a timing signal generating device in which the above mentioned problems are eliminated.

Another object of the present invention is to provide a timing signal generating device capable of giving accurate timing information.

A further object of the present invention is to provide a timing signal generating device in which the number of mechanical operating portions such as cams and microswitches is minimized so that error caused by the mechanical operating portions, which is inevitable in the conventional devices, is minimized or eliminated.

A still further object of the present invention is to provide a timing signal generating device having no cam and no microswitch.

The above and other objects of the present invention are accomplished by a timing signal generating device constructed in accordance with the present invention, which comprises a rotating member mounted on a rotating shaft to rotate therewith and having a plurality of marks located on the periphery thereof, and detecting means for detecting the marks on the rotating member to generate pulse signals in response to detection of the marks. Counting means is connected to the detecting means to count the pulse signals therefrom. Gate means is connected to said counting means to generate timing signals in response to a predetermined condition of the counting means. The counting means may be preferably a shift register, and each of the logic means has inputs each connected to a predetermined stage of the shift register, so as to generate a timing signal having information including starting time and terminating time of operation.

The above and other objects and effects of the present invention will be apparent from the following detailed description of preferred embodiments of the present invention in conjunction with the accompanying drawings.

BRIEF DESCRIPTION OF THE DRAWING

FIG. 1 is a front view of a rotating disc used in the present invention for generating timing information;

FIG. 2 is a longitudinal sectional view of rotating disc such as that shown in FIG. 1, but having magnetic pole pieces on the disc as timing marks;

FIG. 3 is a sectional view similar to FIG. 2, except that the disc has through-holes as timing marks;

FIG. 5 is a graph showing the waveform of a signal represented at each point in the electric circuit shown in FIG. 4.

DESCRIPTION OF THE PREFERRED EMBODIMENTS

Figure 4:
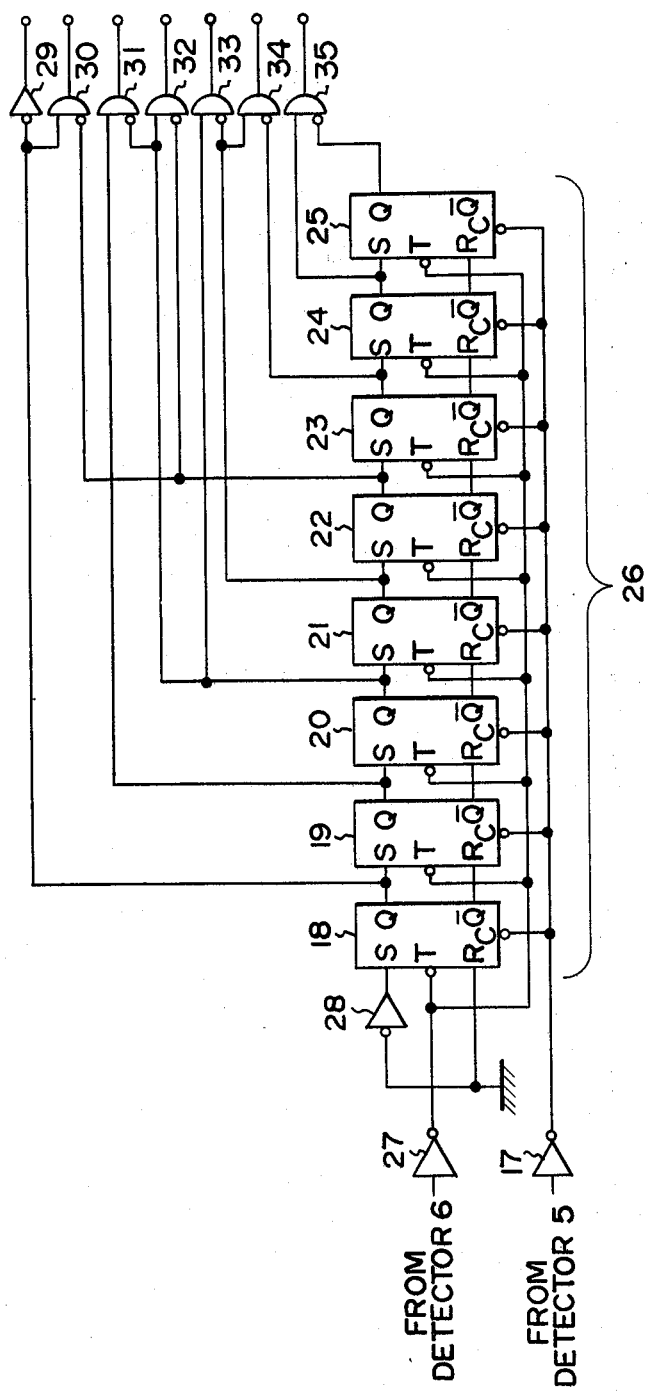
FIG. 4 is a block diagram of an electric circuit used in a timing signal generating device according to the present invention.

Referring to FIG. 1, there is shown a rotating disc 1 fixedly mounted on a rotating shaft 2 angular displacement of which serves as reference for timing of each operation. The rotating disc 1 has a reference mark 3 positioned thereon apart from the shaft 2 by a suitable distance. The rotating disc 1 also has a plurality of timing marks 4a, 4b, 4c . . . 4h positioned apart from one another on a circle having a radius different from the distance between the reference mark 3 and the rotating shaft 2. Mark detectors 5 and 6 are located opposite one face of the disc 1, on which the marks 3 and 4a, 4b . . . 4h are provided, so as to detect these marks.

The marks 3 and 4a, 4b . . . 4h may be, respectively, magnetic pole pieces 7 and 8 bound on one surface of the disc 1 as shown in FIG. 2, while the detectors 5 and 6 may also be, respectively magnetic heads 9 and 10. As shown in FIG. 3, alternatively, the marks 3 and 4a, 4b . . . 4h may be holes 11 and 12, respectively, perforated through the rotating disc 1, while the detectors 5 and 6 may also be, respectively, photodetectors such as phototransistors 13 and 14 adapted to receive light rays passing through the holes from light emitting means such as light emitting diodes 15 and 16 which are located at the side of the disc opposite to the side at which the phototransistor 13 and 14 are located. Otherwise, the marks may be of other types such as projections or metal pieces, and the detectors may also be of other types such as microswitches or proximity detectors.

The output of the reference mark detector 5 is connected to the input of an inverter 17 whose output is connected to a clear terminal of each of flip-flops 18 to 25, as shown in FIG. 4. These flip-flops 18 to 25 are series-connected in such a manner that Q and $\overline{Q}$ outputs of the flip-flop of a preceding stage are connected respectively to set and reset terminals S and R of the flip-flop of the following stage, so as to constitute counting means such as a shift register 26. The output of the timing mark detector 6 is connected through an inverter 27 to a clock or trigger terminal T of each flip-flop. The set terminal S of the first stage of flip-flop 18 is connected to the output of an inverter 28 whose input is earthed, while the reset terminal R of the first stage is directly earthed. As shown in FIG. 4, the Q output terminal of each flip-flop is connected to a suitable input terminal of logic gates such as a inverter 29 and AND gates 30 to 35.

Now, the operation will be explained assuming that the reference and timing marks 3 and 4a, 4b, 4c ... 4h are located as shown in FIG. 1 and that the shift register 26 is connected to the logic gates 29 to 35. Assume that the rotating disc 1 is roated in the direction of arrow 36. When the reference mark 3 reaches just below the detector 5, this detector 5 detects it and generates a reference signal having a pulse wide of $\tau_0$ as shown in FIG. 5, which is in turn supplied to the inverter 17. The inverted pulse signal from the inverter 17 is fed to the clear terminal of all of the flip-flop 18 to 25 so as to bring them into such a clear condition that each Q output is of a low level while each $\overline{Q}$ output is of a high level.

With further rotation of the disc 1, the detector 5 detects in sequence the timing marks 4a, 4b, 4c ... 4h and generates timing pulses $t_1, t_2, t_3 ... t_8$ having a pulse width of $\tau$ as shown in FIG. 5. These timing pulses are sequentially fed through the inverter 27 to the trigger terminal T of the first stage flip-flop 18. Since a high level voltage is ceaselessly applied to the set terminal S of the flip-flop 18 by the inverter 28 while a low level voltage is also ceaselessly applied to the reset terminal R thereof, the flip-flop 18 is set by the first timing pulse $t_1$ and kept in a set condition with all of the subsequent timing pulses $t_2$ to $t_8$. Since the flip-flop 18 to 25 are connected in series as shown in the drawing, the condition of the first stage flip-flop 18 is sequentially shifted to the subsequent flip-flops 19 to 25 by the subsequent timing pulses $t_2$ to $t_8$. Therefore, the condition of the Q output of each flip-flop becomes as shown in FIG. 5.

Therefore, the inverter 29 which is connected to the Q output of the first stage of flip-flop 18 generates a timing signal $P_1$ having a pulse width of $\tau_a$ as shown in FIG. 5. The AND gate 30 having a non-inverting input connected to the Q output of the flip-flop 18 and an inverting input connected to the Q output of the flip-flop 22, generates another timing signal $P_2$ having a pulse width of $\tau_b$ as shown in the drawing. The other AND gates 31 to 35 generate, respectively, timing signals $P_3$ to $P_7$ having a pulse width of $\tau_c, \tau_d, \tau_e, \tau_f$ and $\tau_g$ respectively, as shown in FIG. 5. The output of each of the logic gates 29 to 35 is connected to a corresponding driving circuit (not shown) for an associated operating device (not shown). The timing signal outputted from each logic gate may be used in such a manner that the leading edge thereof represents the time at which the associated operating device should start its operation, while the trailing edge thereof represents the time at which the associated operating device should terminate its operation.

When the detector 5 detects the reference mark 3 again by the rotation of the disc 1, the detector 5 supplies the reference signal pulse signal to each flip-flop so as to clear them, and then the above mentioned operation will be repeated in the manner mentioned above.

As will be apparent from the above explanation of the embodiment of the present invention, a desired number of timing signals each having a desired pulse width can be obtained by suitably selecting the number of timing marks and their angular arrangement and by suitably connecting the shift register with each logic gate.

As seen from the above, according to the present invention, it is possible to make the trailing edge of one timing signal accurately consistent with the leading edge of another timing signal. Furthermore, many and different required timing signals can easily be obtained without requiring many accurately worked cams. Since the number of mechanical portions is minimized, a series of timing signals can be obtained at a high speed with no error only by rotating the rotating shaft at a high speed, whereby enabling high speed operation of each operating device. Further, since the angular displacement of the rotating disc is ceaselessly synchronized precisely with the timing signals, the timing signals have a high degree of accuracy and reliability.

We claim:

1. A timing signal device for generating, on the basis of angular displacement of a rotating shaft, timing signals for controlling timing of a corresponding one of plural operations performed in a machine, comprising a disc mounted on said shaft to be rotatable therewith and having a reference mark disposed at a point having a first radius and a plurality of timing marks disposed angularly apart from one another on a circle of a second radius different from said first radius, reference mark detecting means and timing mark detecting means located relative to said disc to detect said reference mark and said timing marks, respectively, for generating a pulse signal in response to passage of each of said marks by the associated detecting means as the disc rotates, shift register means for counting said pulse signals, said reference mark detecting means having an output terminal connected to a clear terminal of said shift register means, and said timing mark detecting means having an output terminal connected to an input terminal of said shift register means, a plurality of gate means, the number of said gate means being equal to the number of said operations performed in the machine, each of said gate means having at least one input terminal each connected to an output terminal of a predetermined step of said shift register means so that the gate means generates a timing signal having information concerning starting time and terminating time of the corresponding operation.

2. A timing signal generating device set forth in claim 1 characterized in that said shift register means consists of a plurality of flip-flops connected in series, the trigger terminal and the clear terminal of each flip-flop being respectively connected to said timing mark detecting means and said reference mark detecting means, the set terminal and the reset terminal of the first stage flip-flops being respectively connected to a high level voltage source and a low level voltage source, and the Q output and the $\overline{Q}$ output of each flip-flop being respectively connected to the set terminal and the reset terminal of the succeeding flip-flop, whereby, once each flip-flop is brought into a set condition, the flip-flip is kept in the set condition until it is cleared by said reference mark detecting means.

3. A timing signal generating device set forth in claim 2 in which said reference mark and said timing marks are magnetized marks and in which said reference mark detecting means and said timing mark detecting means are magnetic heads.

4. A timing signal generating device set forth in claim 2 in which said reference mark and said timing marks are through-holes perforated through said disc and in which each of said reference mark detecting means and said timing mark detecting means is composed of light emitting means and photodetecting means arranged in such a manner that said through-hole passes therebetween.

5. A timing signal generating device for use in coin counting and wrapping machines for generating, on the basis of angular displacement of a rotating shaft, timing signals each used for controlling timing of a corresponding one of plural operations performed in the machine, comprising a disc mounted on said shaft to be rotatable therewith and having a single reference mark disposed at a point on one face of the disc and having a first radius and a plurality of timing marks disposed angularly apart from one another on said one face of the disc and a circle of a second radius different from said first radius, reference mark detecting means and timing mark detecting means located relative to said disc to detect said reference mark and said timing marks, respectively, for generating a pulse signal in response to passage of each of said marks by the associated detecting means, as the disc rotates, reference mark detecting means having an output terminal connected to a clear terminal of said shift register means, and said timing mark detecting means having an output terminal connected to an input terminal of said shift register means, a plurality of gate means, the number of gate means being equal to the number of said operations performed in the machine, each of said gate means having at least one input terminal each connected to an output terminal of a predetermined stop of said shift register means so that the gate means generates a timing signal having information concerning starting time and terminating time of the corresponding operation.

6. A timing signal generating device set forth in claim 5 characterized in that said shift register means consists of a plurality of flip-flops connected in series, the trigger terminal and the clear terminal of each flip-flop being respectively connected to said timing mark detecting means and said reference mark detecting means, the set terminal and the reset terminal of the first stage flip-flops being respectively connected to a high level voltage source and a low level voltage source, and the Q output and the $\bar{Q}$ output of each flip-flop being respectively connected to the set terminal and the reset terminal of the succeeding flip-flop, whereby, once each flip-flop is brought into a set condition, the flip-flop is kept in the set condition until it is cleared by said reference mark detecting means.

7. A timing signal generating device set forth in claim 6 in which said reference mark and said timing marks are magnetized marks and in which said reference mark detecting means and said timing mark detecting means are magnetic heads.

8. A timing signal generating device set forth in claim 6 in which said reference mark and said timing marks are through-holes perforated through said disc and in which each of said reference mark detecting means and said timing mark detecting means is composed of light emitting means and photodetecting means arranged in such a manner that said through-hole passes therebetween.

* * * * *